April 29, 1958     T. A. PATCHELL ET AL     2,832,947
CONTROL APPARATUS

Filed Feb. 14, 1956                                  2 Sheets-Sheet 1

INVENTORS.
THOMAS A. PATCHELL
ROBERT MAYER
BY *Arthur H. Swanson*
ATTORNEY.

April 29, 1958 T. A. PATCHELL ET AL 2,832,947
CONTROL APPARATUS
Filed Feb. 14, 1956 2 Sheets-Sheet 2

INVENTORS.
THOMAS A. PATCHELL
BY ROBERT MAYER
ATTORNEY.

United States Patent Office 2,832,947
Patented Apr. 29, 1958

2,832,947

CONTROL APPARATUS

Thomas A. Patchell and Robert Mayer, Havertown, Pa., assignors to Minneapolis-Honeywell Regulator Company, Minneapolis, Minn., a corporation of Delaware Application February 14, 1956, Serial No. 565,399

8 Claims. (Cl. 340—213)

A general object of the present invention is to provide a new and improved control apparatus characterized by its ability to provide highly reliable monitoring and control functions. More specifically, the present invention relates to an apparatus adapted to continuously monitor the value of a condition and to perform an alarm or effect operation in a safe sense upon the development of an unsafe characteristics in that condition.

Generally, the purpose of monitoring is to signal the occurrence of an unsafe characteristic or event in order that corrective action can be taken. To this end, many monitoring devices are adapted to perform a control operation in a safe sense automatically upon the occurrence of such an unsafe characteristic. Such devices to be acceptable, however, must be arranged so that upon the failure of any component therein, the device will operate in such a manner that it will perform its control operation and thereby prevent the occurrence of an unsafe condition while the process is unmonitored. Accordingly, monitoring devices are generally adapted to shut down or stop the process or apparatus associated therewith upon their own partial or complete failure. In many applications such safe failure characteristics are satisfactory. There are some processes and operations, however, where the results of a shut down are so drastic or costly that they are not permissible merely because of the partial failure of the monitor.

It is, therefore, a specific object of the present invention to provide a new and improved monitor adapted to perform a control operation upon the occurrence of an unsafe characteristic in the process or operation being monitored and to signal any partial failure in its own operation. To this end, there is provided a monitor having two channels, each adapted to monitor the same condition.

Still another specific object of the present invention is to provide a monitor having two channels each adapted to monitor the same condition but operative to perform a control operation in a safe sense only if both channels indicate an unsafe condition, or if one channel indicates an unsafe condition and the other channel indicates the monitored condition is approaching an incipient unsafe condition.

A further object of the present condition is to provide a monitor having two channels each adapted to monitor the same condition wherein each channel is independently operative to signal an unsafe condition or its own failure.

In accordance with the principles of the present invention, the above objects are achieved in an apparatus wherein the two identical monitoring channels are utilized to monitor the same condition. Each of these channels employs an alternating current bridge circuit having for one of its arms a thermistor responsive to the characteristic being monitored. The output of the bridge circuit is amplified in a three stage transistor amplifier and applied to a single stage transistor phase discriminator adapted to operate a control relay upon a reversal in the phase of the bridge output voltage. The deenergization of the control relay associated with either channel is operative to cause the energization of an alarm circuit. The deenergization of the control relays of both channels is operative to cause the energization of a control circuit. Each of the channel control relays is operative upon deenergization to connect into the bridge circuit of the other channel a resistance which causes the condition of bridge unbalance to approach its set point by a fixed amount. If the addition of this resistance is sufficient to cause a reversal in the phase of the output voltage from that bridge circuit, the control relay associated therewith is deenergized and the monitor performs its control function. If the addition of this resistance does not cause a reversal in the phase of the bridge output voltage, the alarm circuit energized when the one control relay was deenergized indicates the abnormal functioning of the monitor. In this manner the two independent monitoring channels continually cross check each other and any malfunction is detected by this system cross checking and indicated accordingly.

The various features of novelty which characterize this invention are pointed out with particularity in the claims annexed to and forming part of this specification. For a better understanding of the invention, its advantages, and the specific object obtained with its use, reference should be had to the accompanying drawings and descriptive matter in which are illustrated and described preferred embodiments of this invention.

Figure 1:
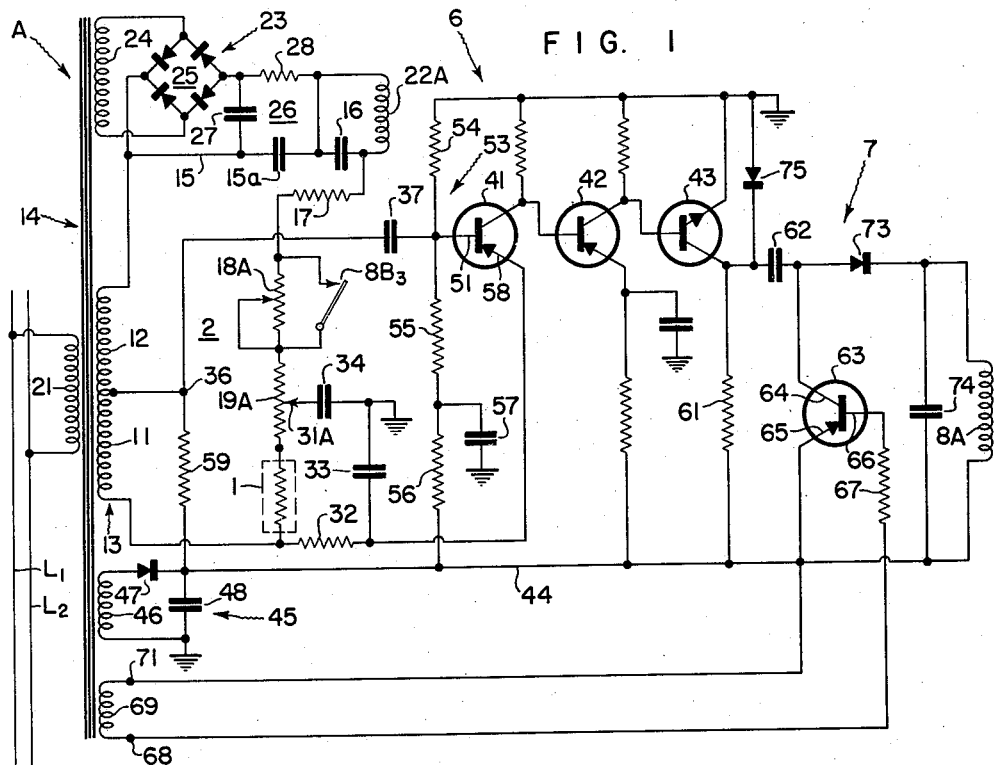
Fig. 1 is a circuit diagram of the two monitoring channels employed in the present invention.
Figure 1:
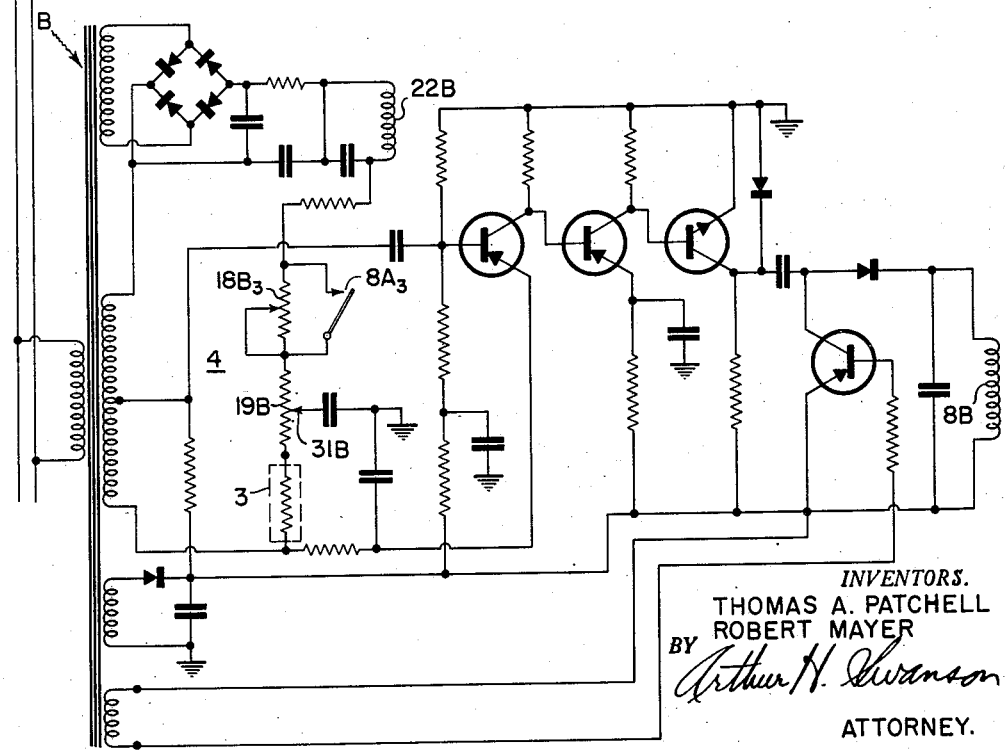

Referring now to Fig. 1, there is shown a circuit diagram of an embodiment of the present invention adapted to monitor a temperature and to perform a control function upon the occurrence of a predetermined high temperature. A typical application for a monitor of this type could be the monitoring of the temperature of a bearing in a piece of rotating machinery such as a turbine or a generator. The present invention employs two identical monitoring channels, A and B, to monitor the same temperature. Both of these channels employ a thermistor connected as an arm of an electrical bridge circuit as a temperature sensing element. Channel A employs a thermistor 1 connected as an arm of a bridge circuit 2 for its temperature sensing element, and similarly channel B employs a thermistor 3 connected as an arm of a bridge circuit 4 as its temperature sensing element. In operation, the thermistors 1 and 3 are positioned, with respect to the process or apparatus being monitored, in such a way that they both would be responsive to the temperature of interest. Since channels A and B are identical in construction and operation, the discussion which follows will be confined, with the exception of channel interconnections and cross checking features, to the construction and operation of channel A.

As shown, the output of the bridge circuit 2 of channel A is connected to the input of a three stage transistor amplifier generally designated as 6. The amplifier 6 amplifies the output of the bridge circuit 2 and applies it to the input of a transistor phase discriminator 7 which is operative to control the operation of a control relay 8A. In addition to the thermistor 1, the bridge circuit 2 comprises a pair of winding sections 11 and 12 of a secondary winding B of a transformer 14, a conductor 15, a capacitor 15A, a capacitor 16, a resistor 17, an adjustable resistor 18A, and an adjustable set point resistor 19A. The bridge circuit 2 is energized by means of the secondary winding 13 of the transformer 14 which has a primary winding 21 connected across a suitable source of alternating current, shown here as the conductors $L_1$ and $L_2$.

As will be explained in more detail later, the bridge circuit 2 has been designed to provide safe failure operation upon the occurrence of a failure of any of the components of the bridge circuit. To this end, a relay 22 has been provided to cause safe failure in the event of an open circuit in the thermistor 1. The relay 22 is energized from a source of direct current 23 which comprises a secondary winding 24 of the transformer 14, a full wave bridge rectifier 25, and a filter 26. The filter 26 includes a capacitor 27 and a resistor 28.

The adjustment of a sliding contact 31A on the set point resistor 19A determines the equivalent temperature of the thermistor 1 at which the bridge circuit 2 will have a null. A resistor 32 shunts the thermistor 1 through capacitors 53 and 34 and thus linearizes the bridge sensitivity over its operating range. The phase of the bridge output signal will change by 180° across the bridge null and therefore, the phase of that signal will indicate a high or low temperature with respect to the set point. The output of the bridge circuit 2 is across the sliding contact 31A of the set point resistor 19A and a junction 36 of the secondary winding sections 11 and 12.

The output of the bridge circuit 2 is coupled by means of a capacitor 37 to the input of the amplifier 6. The amplifier 6 employs transistors 41, 42, and 43 as its amplifying elements. The first two stages of the amplifier 6 are conventional direct coupled amplifier stages with pnp junction transistsor. The third stage is a direct coupled npn junction transistor stage. The amplifier 6 is energized through a conductor 44 from a direct current power supply 45 which comprises a transformer secondary winding 46, a diode rectifier 47, and a filtering capacitor 48. The base 51 of the transistor 41 is connected to a base stabilizing voltage divider 53 comprising a pair of resistors 54 and 55 connected in series. The voltage divider 53 is connected to the power supply 45 by means of a filtering section comprising a resistor 56 and a capacitor 57.

To provide an additional safe failure characteristic, the thermistor shunting resistor 32 has been connected in the emitter circuit of the transistor 41 of the first amplifier stage. The emitter circuit of the transistor 41 can be traced from the emitter 58 through the resistor 32, the transformer secondary winding section 11, and a resistor 59 to the power supply 45. The capacitor 33, in addition to connecting the shunting resistor 32 across the thermistor 1, bypasses the resistor 32 to ground and thereby prevents degeneration across the resistor 32. The safe failure characteristics of this circuitry will be explained in greater detail hereinafter.

The output of the amplifier 6 appears across a resistor 61 in the emitter circuit of the transistor 43. The signal appearing across the resistor 61 is coupled to the input of the phase discriminator 7 by means of a capacitor 62. The phase discriminator 7 employs a pnp junction transistor 63 as a synchronous switch. Accordingly, the collector 64 of the transistor 63 is connected to the capacitor 62 and the emitter 65 of the transitor 63 is connected to the other terminal of the resistor 61. The base 66 of the transistor 63 is connected by means of a resistor 67 to one end terminal 68 of a secondary winding 69 of the transformer 14. The other end terminal 71 of the transformer secondary winding 69 is connected to the emitter 65 of the transistor 63. The resistor 67 limits the base current drawn by the transistor 63.

The voltage across the secondary winding 69 controls the switching action of the transistor 63. A diode 73 is connected in series with the control relay 8A across the emitter collector circuit of the transistor 63. The control relay 8A is a polarized relay designed for energization only when current flows in the low impedance direction of the diode 73. The diode 73 is included in the circuit to provide additional safe failing characteristics and to permit a capacitor 74 to be connected in shunt across the control relay 8A to prevent relay chatter. As shown, a Zener diode 75 is connected across the emitter collector circuit of the transistor 43 in the last stage of the amplifier 6. This diode prevents the voltage across the emitter collector circuit of the transistor 43, which is developed as a result of the switching action of the transistor 63, from exceeding the permitted voltage rating of that transistor.

Figure 2:
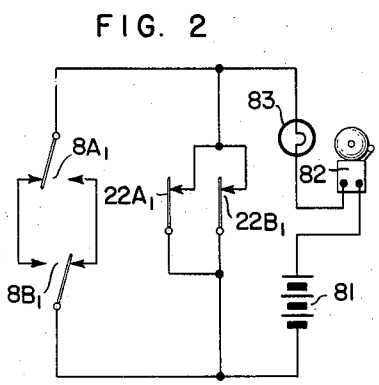
Fig. 2 is a circuit diagram of the alarm circuit employed in the present invention.

Referring now to Fig. 2, there is shown a circuit diagram of the alarm circuit employed in the present invention. All relay contacts shown are shown in their deenergized positions. As mentioned previously, channel B is identical in construction to channel A and accordingly includes a control relay 8B and an open thermistor sensing relay 22B. As shown, the alarm circuit includes a source of alarm energizing current, shown here as a battery 81, an audible alarm means, shown here as a bell 82, and a visual alarm means, shown here as a lamp 83. In the operation of the present invention, all of the relays associated with the monitoring channels are energized under normal operating conditions. Accordingly, the contacts associated with these relays are open when the relays are energized.

The alarm circuit has been arranged so that the bell 82 and the lamp 83 will be energized upon the deenergization of the opened thermistor detection relay of either channel. Accordingly, the contacts $22A_1$ of the open thermistor detection relay 22A of channel A and the contacts $22B_1$ of the open thermistor detection relay 22B of channel B are connected in parallel across the series connected battery 81, bell 82, and lamp 83. In addition, the deenergization of either of the monitoring channel control relays will cause the energization of the alarm circuit. To this end, the contacts $8A_1$ of the control relay 8A of channel A and the contacts $8B_1$ of the control relay 8B of channel B are interconnected as shown so that the deenergization of either control relay without the simultaneous deenergization of the other control relay will cause energization of the alarm means.

Figure 3:
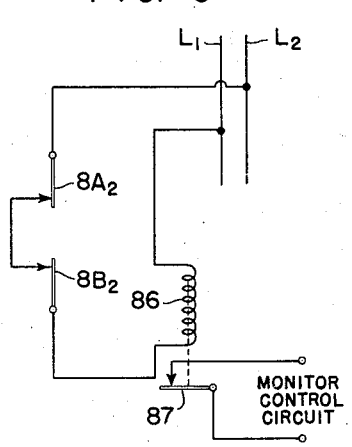
Fig. 3 is a circuit diagram of the control circuit employed in the present invention.

Referring now to Fig. 3, there is shown a circuit diagram of the control circuit of the present invention. Again all relay contacts have been shown in their deenergized positions. This circuit utilizes a relay 86 having a pair of contacts 87 to perform the monitor control operation. As shown, the coil of the relay 86 is connected across an appropriate source of alternating current, shown here as the conductors $L_1$ and $L_2$, through the contacts $8A_2$ and $8B_2$ of the channel control relays 8A and 8B respectively. It should be noted, that the contacts $8A_2$ and $8B_2$ are in series and that both contacts must be closed before the monitor control relay 86 is energized.

In addition to the contacts just described, each of the channel control relays has an additional set of contacts which are employed to connect into the bridge circuit of the other channel a small resistor which tends to lower the set point of that bridge a few degrees. To this end, the control relay 8B of channel B has a set of contacts $8B_3$ connected across the resistor 18A of the bridge circuit 2 of channel A. Similarly, the control relay 8A of channel A has a set of contacts $8A_3$ connected across the resistor 18B in the bridge circuit 4 of channel B. When the control relays are energized, the resistors 18A and 18B are shorted out of their respective bridge circuits through these contacts. However, when the relays are deenergized these resistors are connected into their respective bridge circuits and are positioned in the bridge circuits in such a manner as to lower the bridge set point by an amount proportional to the relationship their resistance value bears to the other bridge parameters.

In considering the operation of the present invention, it should be noted that the adjustment of the sliding contact 31A on the set point resistor 19A in the bridge circuit 2 of channel A determines the temperature at which the thermistor 1 will cause the bridge circuit 2 to have a null. Similarly, the adjustment of the sliding contact 31B on the set point resistor 19B of the bridge 4 of channel B will determine the temperature at which the thermistor 3 will cause the bridge circuit 4 to have a null. In most applications, the set points of the two bridges will be identical, and accordingly the set point adjustments of these bridges may be ganged.

In operation, the phase of the bridge output voltage of both channels is such as to maintain the control relays associated therewith energized until the bridge set point is exceeded. Accordingly, a malfunction of the bridge, amplifier, or phase discriminator, causing a loss of the bridge output signal will cause the relay associated therewith to be deenergized and due to the cross channel check to be indicated by an alarm. The resistance of the thermistor temperature sensing element decreases with increasing temperature, and the phase of the bridge output voltage changes by 180° as the bridge set point is passed. The monitor shown in Fig. 1 is arranged to detect a high temperature and therefore the phase of the bridge output voltage of both channels is arranged with respect to the phase discriminator reference voltage to maintain the control relay energized until the resistance of the thermistor decreases to a value which causes phase reversal.

Figure 4:
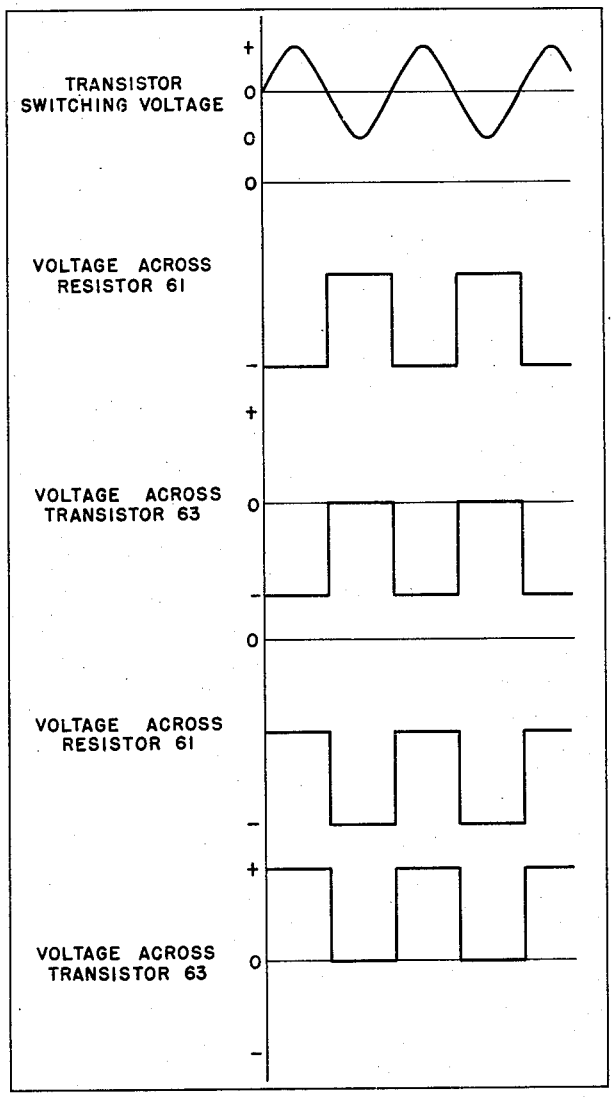
Fig. 4 is a table showing the phase relationships of the voltage appearing across various parts of the phase discriminating circuit.

In considering the operation of the phase discriminator employed in the monitor of Fig. 1, reference should be had to Fig. 4 which is a table showing the phase relations of the voltages across various parts of that circuit. The output of the amplifier 6 appears across the resistor 61 in the collector circuit of the transistor 43 in the last amplifier stage. Due to the gain and the limiting action of the amplifier 6, the transistor 43 is driven in such a manner that it can be considered to be a switch causing a square wave output to be produced across the resistor 61 as it is alternately driven conductive and non-conductive. For the purpose of this explanation, the voltage level of the conductor 44 has been taken as the reference voltage. As shown in Fig. 4, the collector of the transistor 43 goes highly negative as the transistor 43 conducts and returns to a less negative value, determined by the breakdown voltage of the Zener diode 75, when the transistor 43 is non-conductive. The phase of the resulting negative pulses with respect to the switching voltage applied to the emitter-base circuit of the transistor 63 of the phase discriminator 7, controls the operation of the relay 8A.

The transistor 63 is operated as a synchronous switch. When the base 66 is negative with respect to the emitter 65, the transistor may be considered to be a closed switch with a very low voltage drop between the collector and emitter terminals. When the base 66 is positive with respect to the emitter 65, the transistor 63 can be considered to be an open switch with very low leakage between the collector and emitter terminals. During the half cycle of the transistor switching voltage that the transistor 63 can be considered to be a closed switch, the capacitor 62 is connected directly across the resistor 61 and is charged to the voltage appearing across that resistor. Accordingly, if the phase of the amplifier output voltage with respect to the phase discriminator switching voltage is such that the transistor 63 is a closed switch during the half cycle that the transistor 43 is non-conductive, the capacitor 62 is charged to the voltage appearing across the resistor 61 due to the current flow through the Zener diode 75. During the next half cycle, when the transistor 63 is an open switch and the transistor 43 is conductive, the charge on the capacitor 62 subtracts from the voltage developed across the resistor 61 leaving a net voltage across the emitter collector circuit of the transistor 63 of such a polarity that current would flow through the relay 8A if it were not for the diode 73.

When, however, the phase of the amplifier output voltage with respect to the phase discriminator switching voltage is such that the transistor 63 is a closed switch during the half cycle that the transistor 43 is non-conductive, the capacitor 62 is charged to the voltage appearing across the resistor 61 due to the current flow through the transistor 43. During the next half cycle, when the transistor 63 is an open switch and the transistor 43 is non-conductive, the voltage developed across the resistor 61, due to the current flow through the Zener diode 75, subtracts from the voltage across the capacitor 62 leaving a net voltage of such a polarity that the condenser 62 is discharged through the relay 8A. Accordingly, when this phase relationship exists, the relay 8A is energized with pulses of positive current. The relay 8A is polarized and will be energized only on such positive current pulses. The diode 73 in series with the relay 8A allows an integrating capacitor 74 to be placed across the relay 8A to prevent relay chatter.

The monitor of the present invention has been designed to provide almost complete safe failing characteristics. To this end, a cross channel check is provided. The channel control relays 8A and 8B are normally energized when the thermistors 1 and 3 indicate a temperature below the set point. As the temperature being monitored approaches the set point temperature, either relay 8A or 8B will be deenergized before the other due to small differences in the circuit elements. Assume that the relay 8A is deenergized first. Circuit operation is the same for either relay 8A or 8B being deenergized first.

When the relay 8A is deenergized, the contacts 8A$_1$ will transfer giving an alarm, the contacts 8A$_2$ will close but will not energize the main control relay because the contacts 8B$_2$ are still open, and the contacts 8A$_3$ will open lowering the set point of the bridge 4 of channel B. The shift in the set point of the bridge 4 of channel B will cause the channel control relay 8B to be deenergized. When the channel control relay 8B is deenergized, the contacts 8B$_1$ will transfer opening the alarm circuit, contacts 8B$_2$ will close energizing the main control relay, and the contacts 8B$_3$ will open lowering the set point of the bridge circuit 2 of channel A. If the temperatures of the thermistors 1 and 3 go above the set point temperature, the channel control relays 8A and 8B will remain deenergized. If after the relay 8A is deenergized and the relay 8B fails to deenergize, the main control relay will not be energized and a continuous alarm will be signalled. Any opening in the D. C. path around either of the bridge circuits will be detected by the open thermistor detecting relays 22A and 22B and the closing of the contacts 22A$_1$ and 22B$_1$ associated therewith will give an alarm.

The bridge circuits 2 and 4 have been designed to provide safe failure upon the failure of any components thereof.

The kinds of failure considered in this discussion are either open or short circuits of the components. The safe failure is defined here as a failure which will produce either no signal at the output of the first amplifier stage or a large signal of the same phase as would be produced by the heating of the thermistor to a temperature above that corresponding to the bridge set point. Signals of this phase cause the phase discriminator relay to be deenergized.

The output signal of the bridge circuit 2 is taken across the bridge circuit between the tap 36 on the transformer secondary winding 13 and the sliding contact 31A on the set point resistor 19A which latter point is connected to ground through the capacitor 34.

The bridge is so adjusted that its output goes to a null when the resistance of the thermistor assumes a specific value corresponding to the maximum safe temperature of the process or apparatus being monitored. A further decrease in thermistor resistance will produce a bridge output signal of a phase which represents a "hot" or unsafe condition. Similarly, a value of thermistor resistance greater than that producing a null will produce a bridge output signal of a phase which represents a "cold" or safe condition.

The following is a table itemizing the most probable bridge component failures and the result of these failures. It should be noted that all of these failures are safe failures.

| Component | Failure | Result |
| --- | --- | --- |
| Capacitor 27 | short | Will short D. C. open thermistor detection relay supply voltage and relay will deenergize signaling an alarm. |
| | open | D. C. voltage for open thermistor detection relay will be reduced. The relay will deenergize for low thermistor temperatures. |
| Capacitor 15a | short | The relay 22A will lose D. C. energization. |
| | open | Resistor 28 will now be part of A. C. bridge and will cause a high temperature signal thereby deenergizing the output relay. |
| Resistor 28 | open | This will open the D. C. path through the relay 22A, deenergizing that relay. |
| | short | The D. C. bridge voltage will increase, this will raise the temperature of the thermistors, therefore, this channel will trip before the other channel. |
| Capacitor 16 | short | The relay 22A will be deenergized. |
| | open | The impedance of the relay 22A will be in the A. C. bridge, causing a high temperature signal deenergizing the output relay. |
| Capacitor 37 | open | No signal to the amplifier. |
| | short | The base 51 of transistor 41 tries to become more positive than the emitter 58 and the first stage is cut off blocking the signal to following stages. |
| Capacitor 34 | short | The grounding of the bridge makes the emitter 58 of the transistor 41 negative causing the first amplifier stage to cut off. |
| | open | No signal to amplifiers. |
| Capacitor 33 | short | Emitter 58 of the transistor 41 grounded, cutting off the first amplifier stage. |
| | open | A "hot" signal applied to amplifiers causing deenergization of channel control relay. |
| Resistor 32, Resistor 59, and Winding 11. | open | Opens D. C. emitter current return path causing first stage to be nonoperative. |
| Resistor 17, Resistor 18A, and Winding 12. | do | Removes "cold" signal source and provides a full "hot" signal to amplifier causing relay deenergization. |
| Any opening in the D. C. bridge current path including Resistors 17, 18A, 19A, Thermistor 1, Windings 11 and 12, Rectifier 25 and Resistor 28. | | Causes deenergization of open thermistor detection relay 22A. |
| Thermistor 1 | Ground on either side. | Makes emitter of transistor 51 too negative causing the first amplifier stage to cut off. |

The amplifier of the present invention has also been designed to incorporate as many safe failure features as possible. Since the channel control relays are normally energized for thermistor temperatures below the set point, any failure in the amplifier which causes the loss of the bridge output signal will cause relay deenergization and consequently safe failure. The following is a table of additional amplifier safe failure characteristics.

| Component | Failure | Result |
| --- | --- | --- |
| Amplifier Resistors | open or short | A failure of a resistor in the amplifier will result in a loss of the output signal. Failures of the type listed will cause a transistor to either overload itself and fail or to be biased to cut-off. Thus, such failures will cause the channel control relay to be deenergized. |
| Amplifier Capacitors | short | No signal will pass through the amplifier deenergizing the channel control relay. |
| | open | The signal through the amplifier will be attenuated dropping the channel control relay. |
| Capacitor 57 | short | The biasing of the first transistor stage will be changed opening the signal path through the amplifier; thereby deenergizing the channel control relay. |
| | open | Ripple voltage from the power supply will cause one channel to deenergize before its mating channel. |
| Capacitor 48 | short | The amplifier will be deenergized, therefore, the channel control relay will be deenergized. |
| | open | The channel control relay will deenergize. This requires that the A. C. voltage to the D. C. supply be properly phased. |

It should be noted that any failure in the amplifier power supply 45 resulting in the loss of amplifier energizing current will also result in safe failure.

The phase discriminator of the present invention has also been designed to provide as many safe failure features as possible. To this end, it should be noted that the phase discriminator 7 is not a conventional circuit. Several novel features have been employed to achieve the desired safe failure operation. In conventional transistor phase discrimination, for example, the load is generally connected in series with the reference voltage and the output electrodes of the transistor. While such a configuration is adequate for many applications it has the inherent unsafe feature that a short across the output electrodes of the transistor will cause permanent energization of the load. In the phase discriminator of the present invention, the reference voltage is applied to the input electrodes of the transistor and the load is connected in parallel with the transistor output electrodes. In this manner a shorting of the transistor output electrodes cannot result in relay energization.

The following is a table of additional phase discriminator safe failure characteristics:

| Component | Failure | Result |
| --- | --- | --- |
| Capacitor 62 | open | There would be no signal to the channel control relay deenergizing it. |
| | short | The channel control relay will deenergize. The transistor 63 will short the resistor 61 every half cycle. |
| Diode 73 | short | The capacitor 74 across the channel control relay cannot hold a charge, therefore, the relay will deenergize. |
| | open | There would be no signal into the channel control relay, deenergizing it. |
| Capacitor 74 | short | The channel control relay will deenergize. |
| | open | The channel control relay will either chatter or deenergize, both will signal an alarm. |
| Transistor 63 | Collector shorted to base. | The relay will deenergize when the bridge is at its null. |
| | Open Collector | The discriminator will not function and there will be no energizing voltage across the relay. |
| | Collector shorted to emitter. | The discriminator will be shorted and the relay will be deenergized. |
| | Open emitter | All discriminator action will be lost and the relay will be deenergized. |
| | Open Base | The relay will deenergize except at high temperatures. |
| Resistor 67 | short | The discriminator transistor will fail and deenergize the relay. |
| | open | The relay will deenergize, except at high temperatures. |

It should be noted that while the present invention has been shown adapted to monitor a temperature and to perform a control operation upon the occurrence of a high temperature that it could be adapted to perform its control function upon occurrence of a low temperature. In addition, it is within the scope of the present invention that another type condition sensing element be substituted for the thermistor shown in order that some other characteristic can be monitored.

Subject matter disclosed but not claimed herein is being disclosed and claimed in the copending applications of Kenneth H. Beck, Serial No. 565,398, and Allen I. Frank, Serial No. 565,400, filed on even date herewith and assigned to the same assignee.

While, in accordance with the provisions of the statutes, there has been illustrated and described the best form of the embodiment of the invention now known, it will be apparent to those skilled in the art that changes may be made in the form of the apparatus disclosed without departing from the spirit of the invention as set forth in the appended claims, and that in some instances certain features of the invention may be used to advantage without a corresponding use of other features.

Having now described this invention, what is claimed as new and that which it is desired to secure by Letters Patent is:

1. In combination, an apparatus having a plurality of elements each associated with a common characteristic to be monitored, an alarm circuit, a control circuit, means associated with each of said elements and with said alarm and control circuits and connected to be operated when said characteristic is within a predetermined range of values and operative to energize said alarm circuit when less than all of said elements sense said characteristic as being within said predetermined range of values, and means operatively connected to said first mentioned means to energize said control circuit when all of said elements sense said characteristics as being outside said predetermined range of values.

2. In combination, a plurality of elements each having a characteristic the value of which is to be monitored, each of said elements having switching means controlled thereby and arranged for operation when said characteristic reaches or appears to reach a predetermined value, each of said elements having means associated therewith to simulate incipient approach of said element to said predetermined value when energized, means interconnecting for energization each of said switching means and said last mentioned means associated with all of the other switching means, an alarm circuit, and a control circuit, each of said switching means being connected to energize said alarm circuit when operated, said switching means being so connected that said control circuit is energized only when all of said switching means are operated.

3. In combination, an apparatus having a pair of elements each responsive to the same condition the value of which is to be monitored, each of said elements having a relay associated therewith adapted for operation when said condition reaches a predetermined value, alarm means, each of said relays being connected to actuate said alarm means when operated, and control means adapted to be actuated when both of said relays are operated.

4. In combination, two independent monitoring systems each adapted for monitoring the same condition, each of said systems having an element responsive to the condition being monitored, switching means responsive to said element adapted to perform a control function when said element reaches a predetermined value, and means interconnected for energization with the switching means of the other of said systems to simulate incipient approach of said element to said predetermined value when the switching means of one of said systems performs its control function, alarm means associated with both of said systems and energized when either of said systems performs its control function, and control means associated with both of said systems and operative only when both of said systems perform their control functions.

5. A temperature monitoring system comprising in combination two independent monitoring channels each monitoring the same condition, each of said channels comprising a bridge circuit having for one of its arms an element responsive to the condition being monitored and relay control means connected to the output of said bridge circuit and adapted for deenergization upon the occurrence of a predetermined bridge output, an alarm circuit, means connecting both of said relay control means to said alarm circuit to cause the energization thereof when either of said relay control means are deenergized, means connecting the relay control means of each channel to the bridge circuit of the other channel to cause the output of that bridge circuit to step nearer to its relay control means deenergizing value upon the deenergization of the thus interconnected relay control means, control means, and means connecting both of said relay control means to said control means to cause the energization thereof upon the deenergization of both of said relay control means.

6. In combination, two independent monitoring systems adapted for monitoring the same condition, each of said systems comprising a condition sensing element responsive to the condition being monitored, a bridge circuit having said element connected as an arm thereof, an amplifier connected to the output of said bridge circuit, a phase discriminator connected to the output of said amplifier, and a relay connected to said phase discriminator adapted to be deenergized upon the occurrence of a predetermined change in the condition being monitored, alarm means connected to the relays of both of said systems and adapted to be energized when either of said relays is deenergized, control means connected to the relays of both of said systems and adapted to be energized when both of said relays are deenergized, and means connecting the relays of each of said systems to the bridge circuit of the other system to cause the set point of that bridge circuit to be changed when the thus connected relay means is deenergized.

7. In a monitoring system, two channels for monitoring the same condition, each of said channels having a predetermined set point, alarm means common to both channels, control means common to both channels, both of said channels being connected to independently operate said alarm means, and means interconnecting said channels to permit one channel to operate said control means only if the other channel is within a predetermined range of its set point.

8. In a monitoring system, two similar channels for monitoring the same condition, each of said channels comprising a condition sensing element the value of which varies with changes in said condition, control means operative to perform a control function when said element reaches a predetermined value, and set point means associated with said element and said control means for determining said predetermined value, an alarm circuit, means connecting both of said control means to said alarm circuit to cause the operation thereof when the control means of either of said channels performs its control operation, a monitoring control circuit, means connecting the control means of each of said channels to said monitoring control circuit to cause the energizing thereof when the control means of both of said channels perform their control functions, and means connecting the control means of both of said channels to the set point means of the other channel to change the predetermined value of said other channel when the control means of either of said channels performs its control function.

References Cited in the file of this patent

UNITED STATES PATENTS

| | | |
|---|---|---|
| 2,302,061 | Schirm | Nov. 17, 1942 |
| 2,423,541 | Wilson et al. | July 8, 1947 |
| 2,431,158 | Yates | Nov. 18, 1947 |
| 2,654,082 | Cahusac et al. | Sept. 29, 1953 |
| 2,690,477 | Friedmann et al. | Sept. 28, 1954 |
| 2,691,889 | Dion et al. | Oct. 19, 1954 |
| 2,728,904 | Schafer | Dec. 27, 1955 |